May 16, 1967  A. J. SENTZ  3,319,829
ENCAPSULATED PRESSURE REGULATOR FOR LIQUID DISPENSER
Filed Feb. 24, 1966  3 Sheets-Sheet 1

INVENTOR
Adam J. Sentz
BY
Meyer, Baldwin, Doran & Egan
ATTORNEYS

May 16, 1967 A. J. SENTZ 3,319,829
ENCAPSULATED PRESSURE REGULATOR FOR LIQUID DISPENSER
Filed Feb. 24, 1966 3 Sheets-Sheet 3

INVENTOR
Adam J. Sentz
BY
Baldwin, Doran & Egan
ATTORNEYS 3,319,829
ENCAPSULATED PRESSURE REGULATOR FOR LIQUID DISPENSER
Adam J. Sentz, Strongsville, Ohio, assignor to The Barth Corporation, Cleveland, Ohio, a corporation of Ohio
Filed Feb. 24, 1966, Ser. No. 529,737
12 Claims. (Cl. 222—5)

This application is a continuation-in-part of my now abandoned co-pending application of Ser. No. 486,149, filed Sept. 9, 1965.

This invention relates to improvements in a compact pressure regulator incorporated in a plug or capsule body and more particularly to one adapted to be incorporated in a shroud or housing as part of a dispenser for liquid from a receptacle.

One of the objects of the present invention is to provide a plug-type pressure regulator adapted to be threaded into a housing for a pressurized cartridge containing a gas such as carbon dioxide under pressure, to pierce the cartridge in a very simple operation so as to release the pressurized fluid, to balance the pressure of the released fluid acting on one side of a differential pressure partition against a loaded spring on the opposite side of the partition so as to release the fluid at a controlled pressure for use in dispensing fluid from a vessel attached to the dispenser.

The invention includes the design of the regulator parts in a novel fashion so that a very compact assembly results.

Another object of the invention is to provide a very light weight regulator of the type described and containing an enlarged low pressure chamber to prevent difficulty from freezing of the expanding gas.

Other objects and advantages of the present invention will be apparent from the accompanying drawings and description and the essential features thereof will be set forth in the appended claims.

In the drawings—

FIG. 8 is a central sectional view similar to FIG. 4 showing a third embodiment of this invention; while

Figure 1:
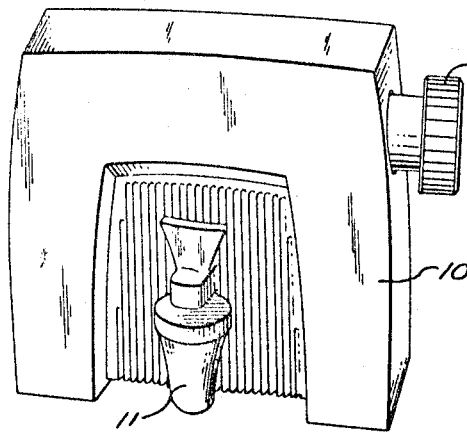
FIG. 1 is a perspective view showing the front of a shroud for attachment to a liquid dispenser.
Figure 2:
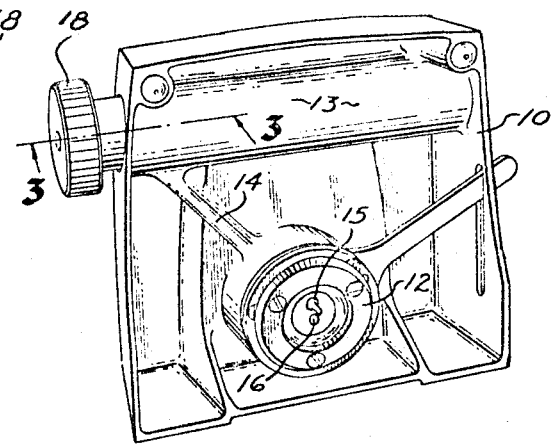
FIG. 2 is a perspective view of the rear of the same.

While other uses of this invention are envisioned, one use is illustrated in FIGS. 1 and 2 in connection with a dispenser for liquids in a container (not shown). The shroud 10 carries on its front face a faucet or tap 11 which communicates through the shroud with a fitting 12 on the rear face thereof adapted to be clamped on the neck of a liquid container. The pressure regulator of this invention is located within the housing 13 near the top of the shroud and the outlet of the pressure regulator is connected through a tubular passageway 14 in the shroud with a tube 15 which connects the pressurized fluid into the container to force the contents thereof through the outlet 16 in the fitting 12 for dispensing through the faucet 11.

Figure 3:
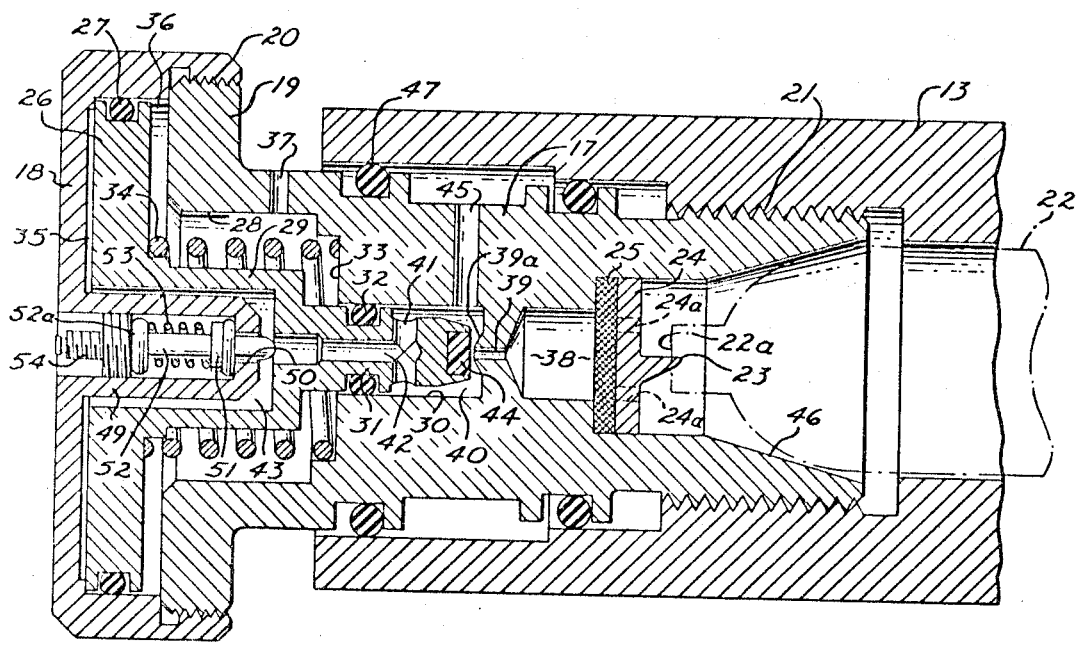
FIG. 3 is a section view, enlarged, taken along the line 3—3 of FIG. 2.

Referring now to FIG. 3, the encapsulated pressure regulator is located at the left end of the housing 13 as shown in FIG. 2 and the reference character 13 is applied to a portion of FIG. 3 to indicate the general position of this housing although its exact shape may vary. The pressure regulator is completely enclosed in a body 17 and a cap 18. The body is generally cylindrical in character, with slightly varying outside diameters, except for a radially outwardly extending flange 19 at the outer end thereof which is connected with the cap 18 in a manner to hold the body and cap together. A specific form of connection is shown at the threads 20. The inner end of the body is provided with a threaded connection 21 with the housing 13. This invention is intended to be used with a pressurized cartridge 22 also held in the housing 13 having a sealed end 22a adapted to be breached by a piercer 23 upon sufficient manipulation of the threaded connection 21. The piercer includes a base portion 24, press fitted into, or otherwise suitably secured to, the body 17 near the inner end thereof. Suitable openings 24a are provided through the member 24 for flow of the pressure fluid outwardly. A filter 25 is preferably provided to make sure that foreign material does not enter the pressure regulator so as to get into the dispensed liquid. Between the left end of the body 17 and the cap 18 there is provided a differential pressure chamber in which is a differential pressure partition which is here shown specifically as a piston head 26. It should be understood that a flexible diaphragm might be used in this position. The periphery of the piston head is sealed against the cylindrical walls of the cap 18 as by means of the O-ring 27. The body 17 has a larger bore 28 at the outer end thereof which surrounds a shank 29 which extends inwardly from the piston head 26. A smaller bore 30 extends inwardly from the larger bore 28 and houses a valve stem 31. The valve stem is a relatively snug fit in its bore 30 and is sealed against leakage as by the O-ring 32. A shoulder 33 is found between the bores 28 and 30. A pressure regulator spring 34 is held between the piston head 26 and the shoulder 33. A passageway extends from adjacent the piercer 23 to a pressurized portion 35 of the differential pressure chamber on the outer face of the piston head 26. A depressurized portion of the chamber 36 is on the inner face of the piston head and is preferably vented to the atmosphere through a vent 37. The passageway from 23 to 35 includes a small chamber 38 adjacent the filter 25, a valved passageway 39, a regulated pressure chamber 40, passages 41 and 42 through the valve stem 31 and a hollow interior portion 43 of shank 29.

It results from the above construction that pressure fluid from the cartridge 22 eventually reaches the outer face of piston head 26 and is exerted against the tension of spring 34 so that when the pressure in chamber portion 35 overcomes the spring, a valve member 44 on the inner end of valve stem 31 closes the passageway 39 sufficiently so that the pressure against the outer face of piston head 26 just overcomes the spring 34 at all times. The fluid at regulated pressure escapes through the outlet 45 to the previously mentioned tubular passageway 14 for use to exert pressure in the liquid container.

To keep the pressure regulator as compact as possible, the inner end of the body is provided with a bore 46 to snugly receive the pressurized cartridge 22 and the wall between the bore 46 and the threaded connection 21 is preferably kept not sufficiently greater than that necessary to withstand the pressure fluid released from cartridge 22. It will be noted that the outside diameter of the body 17, save for the flange 19, is not substantially greater than the diameter at the inner end where the threaded connection 21 is provided. Leakage of the high pressure gas between the body 17 and housing 13 is prevented by suitable sealing means such as two O-rings 47 and 48.

Preferably, but not necessarily, a pressure relief valve is provided as a safety feature in case the controlled pressure in chamber portion 35 exceeds a predetermined desired value. As shown at the left end of FIG. 3, the cap 18 is provided with a hollow central projection 49 extending into the hollow 43 of the shank 29. A pressure relief opening 50 is provided between the hollow of the shank and the hollow of the central projection 49. The pressure relief valve comprises a valve head 51 which is slidable on a stem 52 and held closed by a spring 53 engaged between the valve head and a fixed head 52a on the stem 52. A plug 54 has a threaded connection with the hollow inside wall of the projection 49 and serves to regulate the tension on spring 53 so as to control the pressure at which the relief valve opens.

In one embodiment of this invention, a steel beer container has a spud or neck which is connected to the fitting 12, a cartridge is utilized containing $CO_2$ at about 840 pounds per square inch pressure, and the tension on spring 34 is so chosen that the pressure regulator holds a pressure of about eight to ten pounds per square inch in chamber 40. The relief valve 51 in this embodiment is set to open at about thirty pounds per square inch.

The device described herein may be used to dispense beer, soft drinks, milk and other liquids. The plug type pressure regulator itself may be used in other assemblies where it is desired to provide a compact pressure regulator of the type described.

Figure 4:
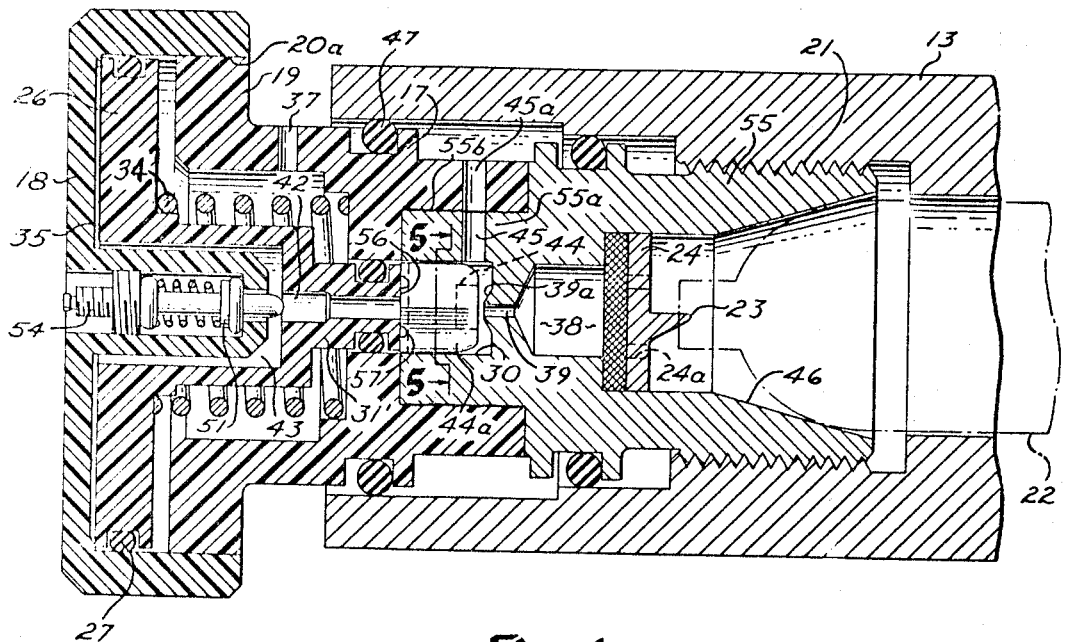
FIG. 4 is a sectional view similar to FIG. 3 showing a modification.
Figure 5:
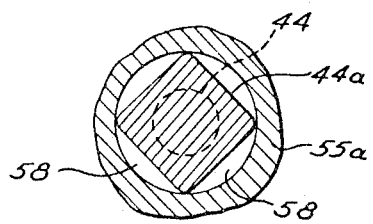
FIG. 5 is a transverse sectional view, enlarged, taken along the line 5—5 of FIG. 4.
Figure 6:
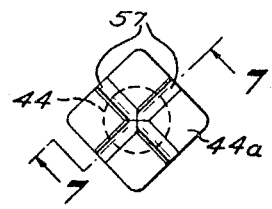
FIG. 6 is an end elevation taken at the left-hand end of the member shown in section in FIG. 5.
Figure 7:
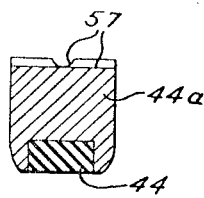
FIG. 7 is a sectional view taken along the line 7—7 of FIG. 6.

The modification shown in FIGS. 4 through 7 shows a form which is less expensive to make but as satisfactory in every way as the first embodiment. All parts having the same form and function as those described in FIG. 3 are given the same reference characters. The chief difference here is that the body 17, at least the outer end thereof, and the cap 18 and piston 24 are all made of plastic. The inner end, indicated at 55 in FIG. 4, is made of metal sufficient to withstand the high pressure released from the cartridge 22 when it is breached by the piercer 23. The division line between the metal and plastic is here shown as occurring at about the position of the valve seat 39a at the outer end of the passageway 39. The portion 55 has an outwardly extending collar portion 55a surrounding the bore 30. The outer surface 55b of this collar portion 55a is roughened in any suitable fashion so that it will be bonded ot the body 17 when the latter is molded from a suitable plastic material. At that time a passageway 45a is cored through the body 17 in alignment with the passageway 45 in the member 55.

In this modified form of the device, the piston 26 has an inwardly extending valve actuator 31' which terminates in an abutment 56 which is spaced from the valve seat 39a. Then a separate valve plug 44a lies in a floating position between the abutment 56 and the valve seat 39a and fitting fairly snugly in the bore 30. To take the place of the passageways 41 in the first described embodiment, a plurality of passageways 57 are formed as crossing recesses in the top face of the plug 44a and gas coming through the chamber 38 and passageway 39 can pass outwardly along the sides of the plug 44a in the openings 58 seen in FIG. 5. The flow is then inwardly through passageways 57 to passage 42 and then to portion 35 of the differential pressure chamber. The length of the valve actuator 31' and the valve plug 44a is such that movement of the piston 26 inwardly against the tension of spring 34 is sufficient to close against the valve seat 39a so that the pressure regulator works the same as the first embodiment.

It will be noticed in FIG. 4 that instead of threads 20 securing the cap 18 to the body flange 19, the meeting faces of the parts 18 and 19 are made cylindrical meeting at the face 20a of FIG. 4 and are there sealed together by suitable plastic sealant.

In both forms of the invention, the spring 34 is specially chosen for the desired regulated pressure to be maintained by the device so that no spring regulation is needed.

Figure 8:
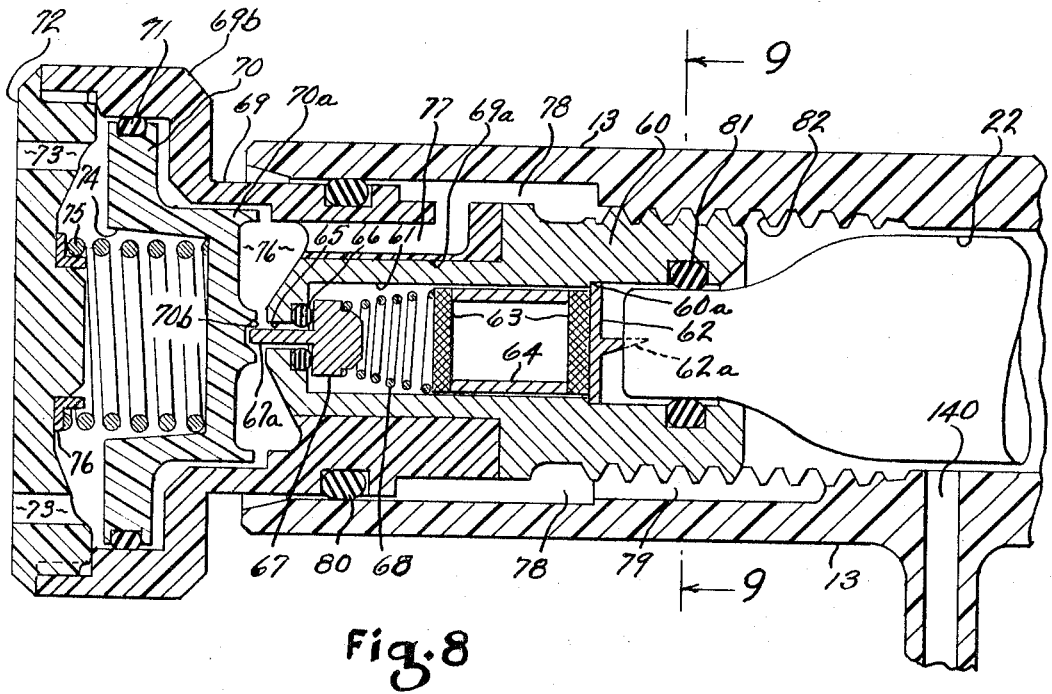
Figure 9:
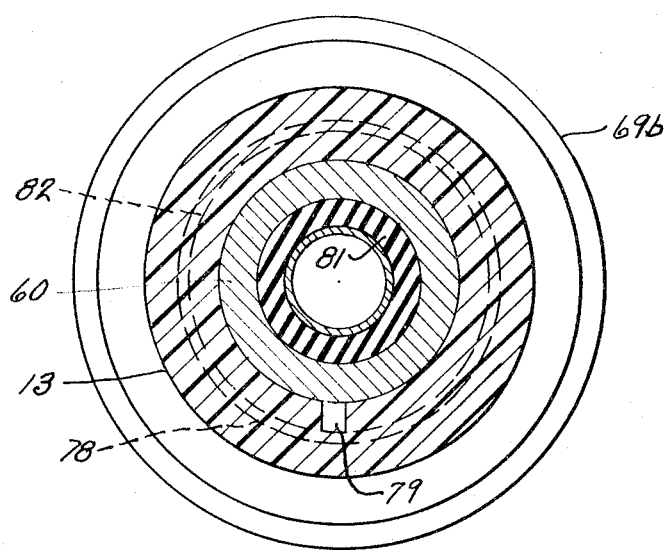
FIG. 9 is a sectional view along the line 9—9 of FIG. 8.

The modification shown in FIG. 8 is similar to that shown in FIG. 4. The housing 13 is similar to that previously described and like that shown in FIGS. 1 and 2. Threaded into the housing is a high pressure resistant body 60 which in this case is preferably of aluminum to save weight. This body has a central generally cylindrical bore 61 in which are housed a stainless steel piercer 62 resting against a shoulder 60a of the body 60 and having a piercing point 62a in position to enter the end of a gas cartridge 22 as previously described. A pair of spaced stainless steel porous sintered filters 63 are spaced by a generally tubular sleeve member 64 preferably of aluminum. Concentrically of the inner end of the bore 61 is a low pressure fluid discharge outlet 65, on the inner side of which is an O-ring valve seat 66 concentric about the outlet 65 and held in a suitable shoulder as shown. A stainless steel valve 67 is normally urged against the seat 66 by a stainless steel spring 68 which is held compressed between the valve and the nearest filter 63. An axially positioned extension or projection 67a of the valve 67 passes through the discharge outlet 65 for engagement with an actuating piston as will presently appear.

A low pressure resistant body 69 of plastic has an inner hollow cylindrical end 69a closely embracing the aluminum body 60 and molded thereto. The outer end of the body 69 is flared outwardly to give a cup-shape formation 69b within which slidingly fits a plastic piston 70 having an inwardly extending projection 70a which is slidingly guided in a portion of the body 69 as shown. The central portion of the bottom of the piston is provided with a recess 70b which receives the projection 67a of the valve 67. The piston is sealed against the portion 69b by means of an O-ring 71. The outer open end of the cup-shape portion 69b of the body 69 is closed by a plastic cap 72 which preferably is tightly secured and sealed to the portion 69b as by a plastic sealant. Through this cap, to vent the space outwardly of piston 70, are provided suitable vent openings 73. A hollow bore 74 is provided concentrically in the intermediate portion of the piston 70 and here there is housed a stainless steel spring 75 held in position by a plastic spring retainer 76. This spring 75 is so chosen that it will maintain the desired low pressure at the outlet end of the regulator as will presently appear.

Between piston 70 and body portions 60 and 69 there is provided an enlarged low pressure chamber 76 which is of sufficient size to prevent freezing of the low pressure gas as it expands after passing through the discharge opening 65. A passageway 77 is cored through the body portion 69a so as to conduct the low pressure gas to an annular chamber 78 which communicates with a narrow outlet 79 leading past threads 82 to the passageway 140 which performs the function of passageway 14 shown in FIG. 2.

An O-ring 80 is provided between housing 13 and body portion 69 to prevent the escape of low pressure gas at that zone.

An O-ring seal is provided at 81 between the high pressure cartridge 22 and the aluminum body 60 to prevent escape of high pressure gas there.

The operation of this third embodiment of the invention should now be clear. The cartridge 22 is inserted in a suitable opening in the housing 13 after which the assembled pressure regulator shown in FIG. 8 is screwed in along the threads 82 until the point 62a pierces the cartridge allowing high pressure gas to escape through the filters 63 to valve 67 where the gas normally escapes through the discharge outlet 65 so long as spring 75 is holding valve 67 off the seat 66. When sufficient gas pressure builds up in the chamber 76 so as to push the piston 70 outwardly against the tension of spring 75, then spring 68 becomes effective to close valve 67. This condition changes back and forth so as to maintain a very constant pressure in chamber 76, passageway 77 and outlet 79 to passageway 140.

In FIGS. 3 and 4 the communication between 45 and 45a respectively with passageway 14 is by way of an opening (not shown) through housing 13.

What is claimed is:

1. A pressure regulator adapted for quick assembly and disassembly with an embracing housing comprising a generally cylindrical body having a threaded connection at its inner end for assembly in a housing and a manipulating knob at its outer end by which the body may be rotated about its axis, a cartridge piercer extended from the inner end of said body in position to pierce a pressurized cartridge by manipulation of said threaded connection by means of said knob, pressure regulating means in said body between said two ends, there being an inlet opening for entry of high pressure gas into said body from a pierced cartridge and communicating with said pressure regulator means, there being an outlet opening for discharge of low pressure gas out of said body and communicating with said pressure regulating means, and there being a low pressure gas chamber between said body and said housing and in communication with said outlet opening when said body is assembled in said housing, whereby said body and pressure regulating means may be quickly rendered operative by insertion into an embracing housing.

2. A pressure regulator as defined in claim 1 wherein said knob is a hollow cap connected to said outer end of said body, the hollow of said cap providing a differential pressure chamber between said cap and said body, a differential pressure partition reciprocally held in said chamber, a seal about the periphery of said partition and engaging the wall of said chamber there, there being a pressurized portion of said chamber on the outer face of said partition, there being a depressurized portion of said chamber on the inner face of said partition, a pressure regulating spring between said partition and said body urging said partition outwardly, a cartridge piercer carried at the inner end of said body in position to breach the seal of a high pressure fluid cartridge presented thereagainst by travel of said body along its threaded connection with such a housing, there being a passageway in said body from adjacent said piercer to the outer face of said partition whereby pressure fluid released from said cartridge opposes the tension of said spring to control the position of said partition, there being a cooperating valve and valve seat for closing said passageway, said valve being operatively connected with said partition to move toward closing engagement with said seat as said partition moves against the tension of said spring to maintain a regulated pressure of fluid in said passageway downstream from said valve, and there being an outlet through said body for said regulated pressure fluid.

3. A regulator as defined in claim 2 wherein an opening is provided through said cap communicating between said pressurized portion of said chamber and atmosphere, and a spring-controlled pressure relief valve normally closing said opening.

4. A regulator as defined in claim 2 wherein said body is generally cylindrical externally and adapted to fit with slight clearance relative to a generally cylindrical bore in said housing, sealing means carried externally of said housing in position to seal between said body and said housing, there being a radially outwardly extending flange at the outer end of said body providing said connection with said cap, said chamber in said cap being generally cylindrical, said partition being a cylindrical piston head sealed against the wall of said chamber for reciprocation therein, said piston head having an inwardly extending cylindrical shank concentric with said head and of less diameter than said head, said shank having a valve stem projection extending inwardly therefrom, there being a centrally located bore at the outer end of said body having walls spaced from said shank, there being a smaller bore extending centrally of said body inwardly from said larger bore, a shoulder between said larger and smaller bores, said spring being helical and surrounding said shank between said shoulder and said piston head, said valve stem projection fitting into said smaller bore and sealed there against fluid leakage, said passageway extending through said stem projection and said shank, said inner end of said body having a central bore to snugly receive a cartridge, said inner end of said body having an outside diameter providing a wall around said last named bore not substantially thicker than necessary to withstand the pressure released from a cartridge, and said body other than said flange being not substantially greater in outside diameter than the inner end thereof, whereby to provide a compact plug holding all parts of said regulator.

5. A regulator as defined in claim 4 wherein said shank is hollow, said cap has a hollow central projection extending into the hollow of said shank, there being a pressure relief opening provided between said hollow of said shank and said hollow of said central projection, and a pressure relief valve in said central projection normally closing said opening.

6. The combination of claim 5 wherein said relief valve comprises a stem and a valve head slidable on said stem and a plug, a spring held between said plug and said valve head, and said plug having a threaded connection with said hollow central projection for regulating the tension of said spring.

7. A regulator as defined in claim 2 wherein said partition has a valve actuator extending inwardly therefrom and having an abutment at its inner end, said valve comprises a valve plug floating between said abutment and said valve seat, and the length of said actuator and said plug being such that inward movement of said partition against the tension of said spring may cause said valve plug to close against said valve seat.

8. A pressure regulator as defined in claim 1, wherein said knob is a hollow cap connected to said outer end of said body, the hollow of said cap providing a differential pressure chamber between said cap and said body, a cylindrical piston head reciprocatably held in said chamber, a seal about the periphery of said piston head and engaging the wall of said chamber there, there being a pressurized portion of said chamber on one side of said piston head, there being a depressurized portion of said chamber on the other side of said piston head, a pressure regulating spring held against said piston head by said body and cap and urging said head toward said pressurized side thereof, a cartridge piercer carried at the inner end of said body in position to breach the seal of a high pressure fluid cartridge presented thereagainst by travel of said body along its threaded connection with such housing, there being a passageway in said body from adjacent said piercer to the pressurized side of said piston head whereby pressure fluid released from said cartridge opposes the tension of said spring to control the position of said piston head, there being a cooperating valve and valve seat positioned to control flow in said passageway, there being an operative connection between said valve and said piston head constructed and arranged to cause closing engagement of said valve with its seat as said piston head moves against the tension of said spring to maintain a regulated pressure of said fluid in said passageway downstream from said valve, and there being an outlet through said body for said regulated pressure fluid.

9. A pressure regulator as defined in claim 8, wherein said pressurized portion of said chamber is on the outer side of said piston head.

10. A pressure regulator as defined in claim 8, wherein said pressurized portion of said chamber is on the inner side of said piston head.

11. A pressure regulator as defined in claim 10 wherein a first portion of said body surrounding said passageway between said piercer and said valve seat is of high pressure resistant material, and a second portion of said body from said valve seat to the outer end of said body is of low pressure resistant material.

12. A pressure regulator as defined in claim 11 wherein said first body portion has a central bore extending from said piercer to said valve seat, and in said bore a filter means and a spring urging said valve toward its seat.

References Cited by the Examiner

UNITED STATES PATENTS

| | | | |
|---|---|---|---|
| 445,257 | 1/1891 | Beck | 222—396 X |
| 614,441 | 11/1898 | Burnett | 222—396 X |
| 2,061,642 | 11/1936 | Williamson | 222—399 X |
| 2,209,956 | 8/1940 | Chase et al. | 222—5 |
| 2,649,661 | 8/1953 | Lamb | 222—399 X |
| 3,197,144 | 7/1965 | Kochner | 222—399 X |

ROBERT B. REEVES, *Primary Examiner.*

N. L. STACK, *Assistant Examiner.*